(12) United States Patent
Ward et al.

(10) Patent No.: US 10,461,927 B2
(45) Date of Patent: Oct. 29, 2019

(54) SECURE CHANNEL ESTABLISHMENT BETWEEN PAYMENT DEVICE AND TERMINAL DEVICE

(71) Applicant: MasterCard International Incorporated, Purchase, NY (US)

(72) Inventors: Michael Ward, Somerset (GB); John Beric, London (GB); Duncan Garrett, London (GB); David Anthony Roberts, Warrington (GB)

(73) Assignee: Mastercard International Incorporated, Purchase, NY (US)

( * ) Notice: Subject to any disclaimer, the term of this patent is extended or adjusted under 35 U.S.C. 154(b) by 196 days.

(21) Appl. No.: 15/642,762

(22) Filed: Jul. 6, 2017

(65) Prior Publication Data

US 2018/0026784 A1    Jan. 25, 2018

(30) Foreign Application Priority Data

Jul. 20, 2016    (EP) .................................... 16180454

(51) Int. Cl.
*H04L 9/08* (2006.01)
*H04L 9/30* (2006.01)
(Continued)

(52) U.S. Cl.
CPC .......... *H04L 9/0844* (2013.01); *H04L 9/0841* (2013.01); *H04L 9/0861* (2013.01);
(Continued)

(58) Field of Classification Search
CPC ... H04L 9/0844; H04L 9/0841; H04L 9/0861; H04L 9/0877; H04L 9/14; H04L 9/3033; H04L 9/3066; H04L 9/3252
(Continued)

(56) References Cited

U.S. PATENT DOCUMENTS

| 2009/0185677 A1* | 7/2009 | Bugbee | H04L 9/0841 380/28 |
| 2010/0111296 A1* | 5/2010 | Brown | H04L 9/0643 380/28 |

(Continued)

OTHER PUBLICATIONS

Communication: "Extended European Search Report", European Patent Office, dated Jan. 16, 2017 (Jan. 16, 2017), European Patent Application No. 16180454.7-1870, 5pgs.

(Continued)

*Primary Examiner* — Haresh N Patel
(74) *Attorney, Agent, or Firm* — Buckley, Maschoff & Talwalkar LLC

(57) ABSTRACT

A method of establishing a secure channel for communication between a first computing device and a second computing device is described. The method uses an elliptic curve Diffie-Hellman protocol, wherein G is an elliptic curve generator point and the first computing device has a unique private key $d_c$ with a public key $Q_c = d_c G$ certified by a party trusted by the second computing device. The first computing device generates (520) a blinding factor r and sends (540) a blinded public key $R = r \cdot Q_c$ to the second computing device. The second computing device generates (510) an ephemeral private key $d_t$ and a corresponding ephemeral public key $Q_t = d_t G$ and sends $Q_t$ to the first computing device. The first computing device generates (530) $K_c = KDF(r \, d_c \cdot Q_t)$ and the second computing device generates (550) $K_t = KDF(d_t \cdot R)$, where KDF is a key derivation function used in both generation operations, to establish a secure channel between the first computing device and the second computing device. G is a point in the elliptic curve group E, wherein E is a group of prime order but E* is the quadratic twist of E and is a group of order $m = z \cdot m'$ where m' is prime and z is an integer, wherein $r \cdot d_c$ is chosen such that z is a factor of $r \cdot d_c$.

(Continued)

Suitable apparatus for performing the method is also described.

19 Claims, 4 Drawing Sheets

(51) Int. Cl.
   *H04L 9/14* (2006.01)
   *H04L 9/32* (2006.01)
(52) U.S. Cl.
   CPC .............. *H04L 9/0877* (2013.01); *H04L 9/14* (2013.01); *H04L 9/3033* (2013.01); *H04L 9/3066* (2013.01); *H04L 9/3252* (2013.01)
(58) Field of Classification Search
   USPC ........................................................ 713/171
   See application file for complete search history.

(56) References Cited

U.S. PATENT DOCUMENTS

| | | | | |
|---|---|---|---|---|
| 2014/0195807 A1* | 7/2014 | Bar-El | ................. | H04L 9/0877 713/168 |
| 2014/0365776 A1* | 12/2014 | Smets | ................... | H04L 9/0841 713/171 |
| 2015/0229473 A1* | 8/2015 | Klein | ................... | H04L 9/0841 |
| 2015/0372811 A1* | 12/2015 | Le Saint | ............... | H04L 9/0841 705/76 |
| 2015/0372875 A1* | 12/2015 | Turon | ................... | H04W 76/10 370/254 |
| 2016/0218875 A1* | 7/2016 | Le Saint | ............... | H04L 9/0822 713/171 |
| 2016/0241389 A1* | 8/2016 | Le Saint | ............... | H04L 9/0844 713/171 |
| 2016/0352689 A1* | 12/2016 | Antipa | ................... | H04L 9/006 713/171 |
| 2017/0063536 A1* | 3/2017 | Brown | .................... | G09C 5/00 713/171 |
| 2017/0091148 A1* | 3/2017 | Takahashi | ................ | G09C 1/00 713/171 |
| 2017/0109735 A1* | 4/2017 | Sheng | ................ | G06Q 20/3678 713/171 |
| 2017/0221052 A1* | 8/2017 | Sheng | ................ | G06Q 20/3678 713/171 |
| 2017/0228731 A1* | 8/2017 | Sheng | .................. | G06Q 20/401 713/171 |
| 2018/0026784 A1* | 1/2018 | Ward | .................... | H04L 9/0844 713/171 |
| 2018/0167208 A1* | 6/2018 | Le Saint | ............... | H04L 9/0844 713/171 |
| 2018/0191503 A1* | 7/2018 | Alwar | .................. | G06Q 20/065 713/171 |
| 2019/0081786 A1* | 3/2019 | Loiseau | ................ | H04L 9/3066 713/171 |

OTHER PUBLICATIONS

Fouque, Pierre-Alain et al., "Fault Attack on Elliptic Curve with Montgomery Ladder Implementation", 2008 5th Workshop on Fault Diagnosis and Tolerance in Cryptography on, 2008, IEEE, Aug. 10, 2008 (Aug. 10, 2008), XP031306599, ISBN: 978-0-7695-3314-8, DOI: 10.1109/FDTC.2008.15, (pp. 92-98, 7 total pages).

Fan, Junfeng et al., "State-of-the-art of secure ECC implementations: a survey on known side-channel attacks and countermeasures", Hardware-Oriented Security and Trust (HOST), 2010 IEEE International Symposium on, Jun. 13, 2010 (Jun. 13, 2010), XP031710164, ISBN: 978-1-4244-7811-8, (pp. 76-87, 12 total pages).

Brzuska, Christina et al., "An Analysis of the EMV Channel Establishment Protocol", Computer & Communications Security, ACM, Nov. 4, 2013 (Nov. 4, 2013), XP058034124, DOI: 10.1145/2508859.2516748, ISBN: 978-1-4503-2477-9, (pp. 373-386, 13 total pages).

PCT International Search Report and Written Opinion for PCT/US2017/042042 dated Oct. 12, 2017, 13 pp.

* cited by examiner

SECURE CHANNEL ESTABLISHMENT BETWEEN PAYMENT DEVICE AND TERMINAL DEVICE

CROSS-REFERENCE TO RELATED APPLICATION

This application is a U.S. National Stage filing under 35 U.S.C. § 119, based on and claiming benefits of and priority to European Patent Application No. 16180454.7 filed Jul. 20, 2016.

FIELD OF DISCLOSURE

The present disclosure relates to methods to establish a secure channel between two devices using cryptographic protocols, and to systems and devices adapted to support such methods. Embodiments of the present disclosure are particularly relevant to establishment of a secure channel between a payment device and a terminal of a transaction infrastructure.

BACKGROUND OF DISCLOSURE

Trust management in transaction systems, such as those using payment cards as transaction devices, has long been a complex technical issue of great commercial importance. As the subversion of transaction systems by malicious third parties has the potential to compromise significant financial assets, it is very important for all points of potential weakness in a transaction system to be protected by appropriate trust mechanisms. In a transaction system using payment cards or other payment devices, for example using the EMV protocols, as transaction devices, this will require appropriate safeguards for individual cards and devices, for terminals, and for the other elements of the transaction system.

EMV is a financial transaction system based around the use of contact and contactless transaction cards. In the EMV payment model, an issuing bank provides an account holding customer with a smart card (or other token) to use when making payments. An acquiring bank provides a merchant with a compatible terminal device to use when accepting payments. The term "terminal" here is considered to cover any device that interfaces directly with such a transaction card (e.g. an interface allowing user entry of a personal identification number (PIN) such as a PIN pad or PIN Entry Device (PED), or a POS terminal or ATM device comprising means such as these, to allow interaction with a transaction card).

Trust management becomes extremely challenging when some system elements (payment cards and even terminals) are only intermittently in contact with the main transaction system, and when it may be necessary for one system element to interact with another system element without a full assurance that this further system element is trustworthy. This may apply, for example, in conflict regions or after a natural disaster, or any other circumstance in which normal communication networks such as the wired or wireless telecommunications infrastructure may be wholly or partially disabled.

Transaction systems using the EMV standards will support offline transactions between a payment card or device and a terminal even when the terminal is not in communication with the main transaction system. Such transactions clearly have added risk as the risk management services provided by the main transaction system are not available, and such financial risk cumulates over time and number of transactions. It is strongly preferable to require terminals and payment devices to make an online connection to the main transaction system sufficiently regularly to control this financial risk. This requirement, however, is difficult to achieve for a conventional transaction card.

SUMMARY OF DISCLOSURE

In a first aspect, the disclosure provides a method of establishing a secure channel for communication between a first computing device and a second computing device using an elliptic curve Diffie-Hellman protocol, wherein G is an elliptic curve generator point and the first computing device has a unique private key $d_c$ with a public key $Q_c = d_c\ G$ certified by a party trusted by the second computing device, the method comprising: the first computing device generating a blinding factor r and sending a blinded public key $R = r \cdot Q_c$ to the second computing device; the second computing device generating an ephemeral private key $d_t$ and a corresponding ephemeral public key $Q_t = d_t\ G$ and sending $Q_t$ to the first computing device; wherein the first computing device generates $K_c = KDF(r\ d_c \cdot Q_t)$ and the second computing device generates $K_t = KDF(d_t \cdot R)$, where KDF is a key derivation function used in both generation operations, to establish a secure channel between the first computing device and the second computing device; wherein G is a point in the elliptic curve group E, wherein E is a group of prime order but E* is the quadratic twist of E and is a group of order $m = z \cdot m'$ where m' is prime and z is an integer; wherein $r \cdot d_c$ is chosen such that z is a factor of $r \cdot d_c$.

Using this approach, a potential attack on the secure channel is prevented by making what would otherwise be an inherent vulnerability a defined property of the system, as will be discussed below.

In certain embodiments, z is a factor of r. In other embodiments, $z = z_1 \cdot z_2$, wherein $z_1$ and $z_2$ are integers, and $z_1$ is a factor of r and $z_2$ is a factor of $d_c$.

In embodiments, G is a point on the NIST P-256 elliptic curve. This approach may however apply to other elliptic curves.

The second computing device may send its ephemeral public key $Q_t$ to the first computing device before receiving the blinded public key R from the first computing device.

In embodiments, the first computing device sends the blinded public key R and an encrypted blinding factor r to the second computing device. The first computing device may send an encrypted public key certificate for the card public key $Q_c$ with the encrypted blinding factor r.

In a second aspect, the disclosure provides a computing device comprising a processor and a memory and configured to carry out the steps of the method of the first aspect as set out above where performed by the first computing device.

This computing device may be an externally powered passive device, and in embodiments may be a payment card.

In a third aspect, the disclosure provides a computing device comprising a processor and a memory and configured to carry out the steps of the method of the first aspect as set out above where performed by the second computing device.

This computing device may be a terminal of a transaction system.

BRIEF DESCRIPTION OF FIGURES

Embodiments of the disclosure will now be described, by way of example, with reference to the accompanying Figures, of which.

DESCRIPTION OF SPECIFIC EMBODIMENTS

Figure 1:
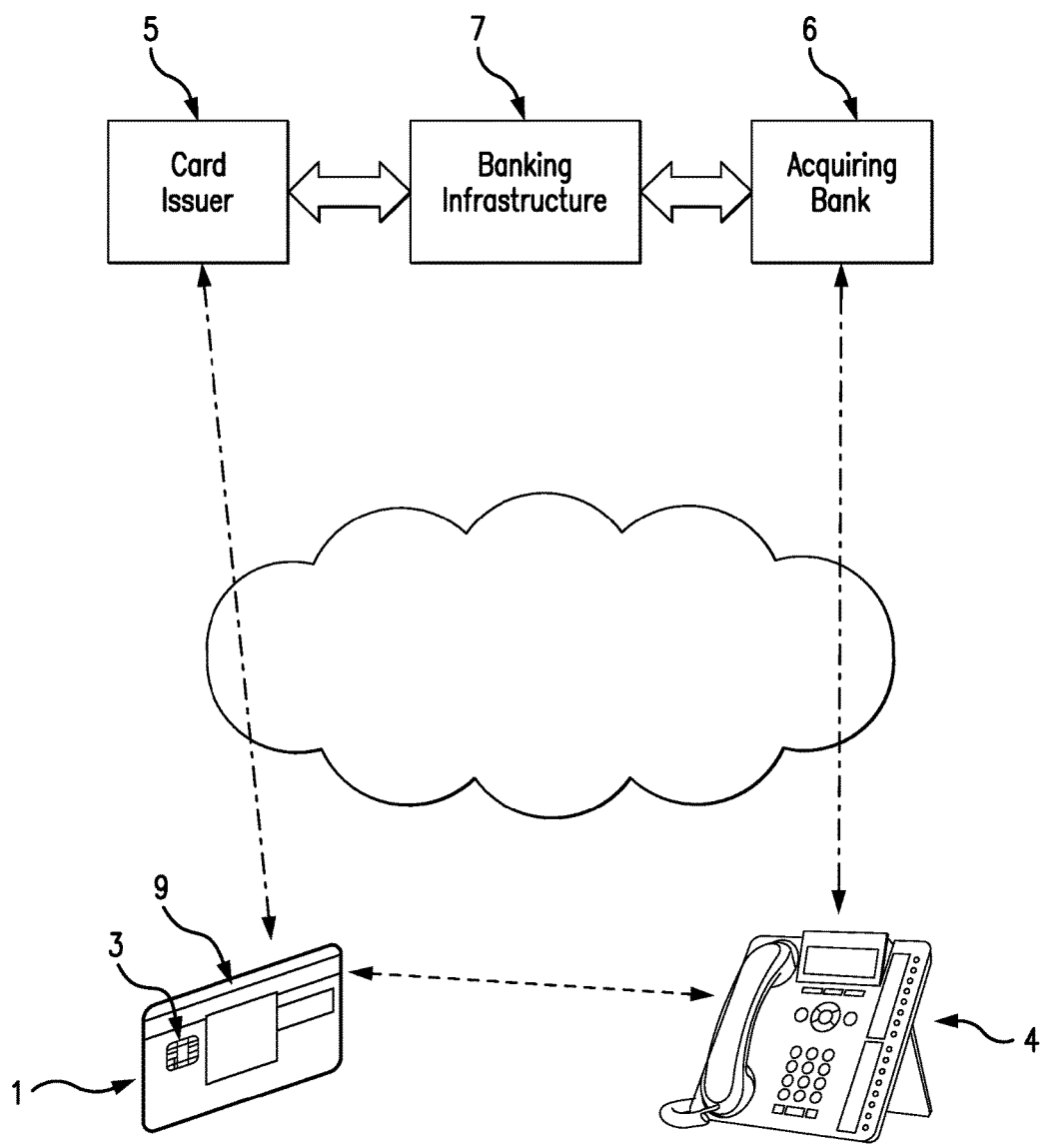
FIG. 1 shows elements of a payment infrastructure in which embodiments of the disclosure may be used.

Specific embodiments of the disclosure will be described below with reference to the Figures. The main embodiment described below relates to a payment card used as a payment device for contactless payments with POI (point of interaction) terminals (such as a POS—point of sale—terminal) under the EMV protocols indicated above. As is discussed further below, further embodiments may be used in other technical contexts.

A user (not shown) is provided with a payment device in the form of a payment card 1—while payment card 1 is the only payment device type shown here, other payment devices (such as a mobile telephone handset with an installed payment application) may be used instead. The payment card 1 comprises a chip 3 with a processor and a memory. The chip 3 is here able to contact a terminal 4 to enable contact card protocols such as those defined under ISO/IEC 7816 to be followed. This payment card 1 also has a magnetic stripe 9 to allow a transaction to be carried out using magnetic stripe protocols. The payment card 1 may also comprise an antenna and associated hardware and software to enable communication with a terminal by NFC and associated contactless card protocols such as those defined under ISO/IEC 14443.

Other computer equipment in the infrastructure is typically fixed, such as point of interaction (POI) terminals 4, of which the example shown is a point-of-sale (POS) terminal used by a merchant interacting with the user. The POS terminal 4 interacts with the payment card 1 through a card reader (not shown discretely from POS terminal 4). The merchant POS terminal 4 is connectable to an acquiring bank 6 or other system in a secure way (either through a dedicated channel or through a secure communication mechanism over a public or insecure channel). As discussed below, in embodiments of this disclosure this connection between merchant POS terminal and acquiring bank 6 is intermittent. Through the medium of terminals or otherwise, the payment card 1 may similarly intermittently be put into connection with a card issuing bank 5 or system associated with the user.

A banking infrastructure 7 connects the card issuer 5 and the acquiring bank 6, allowing transactions to be carried out between them. This banking infrastructure will typically be provided by a transaction card provider who provides transaction card services to the card issuing bank 5. The banking infrastructure 7 provides authorization at the time of purchase, clearing of the transaction and reconciliation typically within the same working day, and settlement of payments shortly after that. The banking infrastructure 7 comprises a plurality of switches, servers and databases, and is not described further here as the details of the banking infrastructure used are not necessary for understanding how embodiments of the disclosure function and may be implemented.

Figure 2:
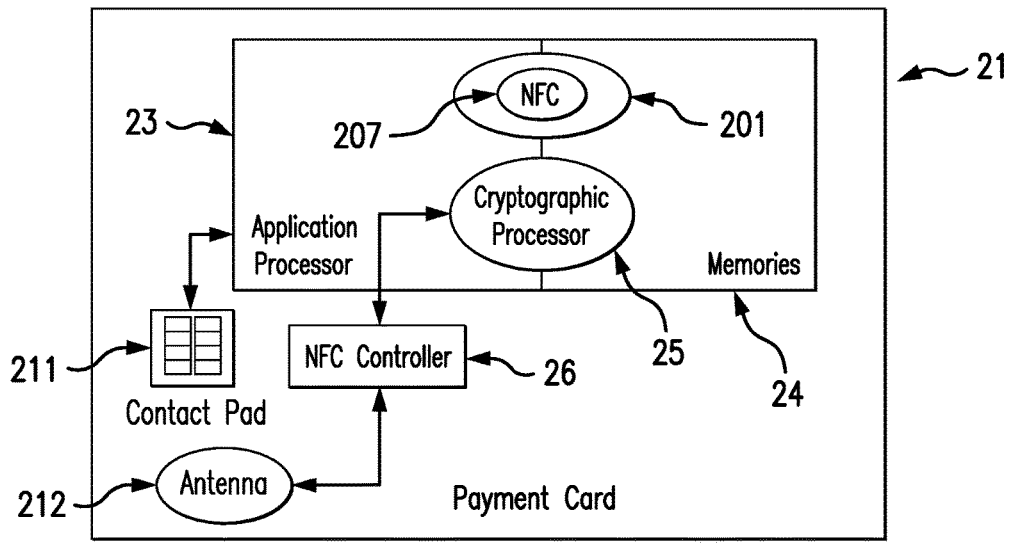
FIG. 2 shows in schematic form a payment card adapted for use as a payment device in embodiments of the disclosure.

FIG. 2 illustrates the functional features of a payment card 21 for use in embodiments of the disclosure in more detail. As indicated above, embodiments of the disclosure may be used with other payment devices, but the embodiment described in detail below relates to a payment card 21 with limited cryptographic capability.

FIG. 2 shows schematically relevant parts of a representative hardware and software architecture for a transaction card such as a payment card 21 (particularly an EMV payment card) suitable for implementing an embodiment of the disclosure. The payment card 21 comprises an application processor 23, one or more memories 24 associated with the application processor and a NFC controller 26. The payment card 21 is equipped with a contact pad 211 for contact transactions using contact card protocols such as ISO/IEC 7816 and also comprises an antenna 212 connected to NFC controller 26 to allow transactions under contactless card protocols such as those defined under ISO/IEC 14443.

In the arrangement shown, the application processor 23 and associated memories 24 comprise (shown within the processor space, but with code and data stored within the memories) a transaction application 201. The application processor 23 provides an NFC application 207 which interfaces with the NFC controller 26. A transaction may be performed over a contact card interface, a contactless card interface, or any other communication channel available to the card for communicating with a terminal (either general purpose or dedicated to the purpose).

The payment card 21 is capable of cryptographic processing, though these capabilities may be limited given the card form factor. In this embodiment, this is shown as a cryptographic processing function 25 provided within the application processor 23 and associated memories 24, but this can be implemented by a physically separated element (which physically and/or logically protected from tampering or subversion) or may be incorporated within the main processing area but logically protected from subversion. In the embodiment described below, the cryptographic processing function 25 possesses one private and public key pair used to identify the card—the private key is unique to the card and its corresponding public key is certified by the card issuer 5. A corresponding card issuer public key may be certified by or on behalf of the provider of the transaction infrastructure 7, establishing a full chain of trust for the transaction infrastructure—this can be verified by the terminal 31 possessing the transaction infrastructure public key. The cryptographic processing function may hold several cryptographic key pairs and can perform cryptographic operations such as calculations to establish a session key, but its lack of processing power will affect its capabilities. For example, while the card may be able to generate new key pairs, signature generation and hashing are computationally demanding—generating a new key pair and signing the public key so it can be verified with a certified public key would be difficult as a result.

Figure 3:
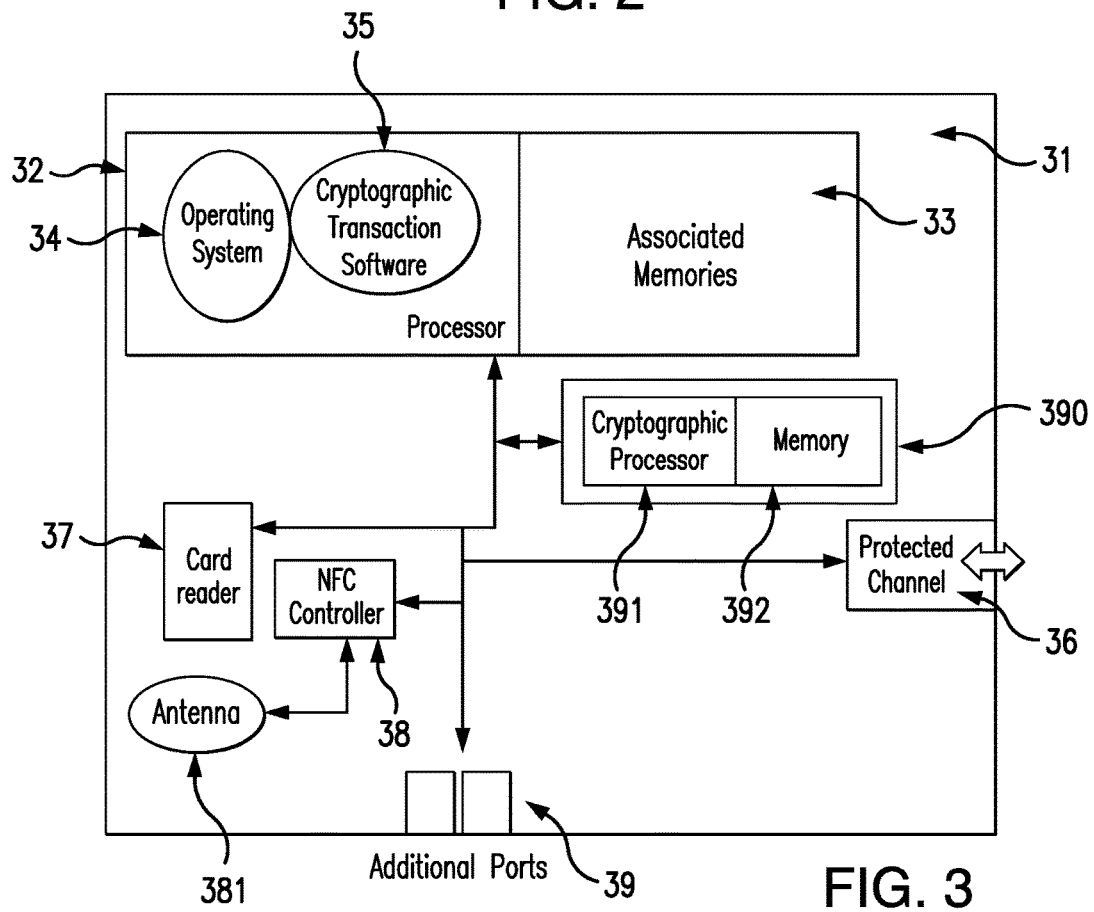
FIG. 3 shows in schematic form a terminal adapted for use in embodiments of the disclosure.

FIG. 3 illustrates the functional features of a terminal for use in embodiments of the disclosure in more detail. The terminal 31 has a processor 32 and associated memories 33. The base function of the terminal in the case shown is to operate as a point of interaction (POI) with a financial system—such a terminal may be a point of sale (POS) terminal or an automated teller machine (ATM) for example. In other embodiments, the terminal may have another function altogether (for example, a security system terminal for evaluating user credentials). In the case shown, the terminal 31 has an operating system 34 and transaction software 35 (these may be provided together in a single assemblage of code, or may both be divided into a number of different components, but are represented here as two elements for convenience). The operating system 34 manages hardware resources and provides common services for applications, whereas the transaction software 35 performs the base function of the terminal and may be provided (for example) as one or more applications. The terminal 31 will generally have a protected channel 36 to another party such as an acquiring bank (this may, for example, be effected over a public network by use of encryption)—embodiments of the disclosure have particular value in situations where this protected channel 36 is only sporadically available to the terminal 31. The terminal 31 will also have a mechanism to make a connection to a device such as a transaction card. In this case, the terminal has a contact card reader 37 and an NFC controller 38 and antenna 381 to allow a contactless card connection to a contactless card, or a device such as an NFC-enabled mobile telephone able to act as a proxy for a contactless card. The terminal 31 may have additional ports 39 to allow data to be provided to it from other sources (for example, by USB stick). Transactions may be established through the contact card reader 37 or through the NFC controller 38, or indeed any other appropriate local connection.

The terminal 31 has capability to carry out cryptographic operations, including the generation of new key pairs. While (as noted above with reference to the discussion of the transaction card) this can in principle be provided inside or outside the main operating environment, this is provided here by a secure module 390 within the terminal containing a cryptographic processor 391 and a memory 392. As with the card, the terminal may have a private and public key pair to identify it (and may have a similar chain of trust ending with the transaction infrastructure provider), but it is also capable of generating new public and private keys, and in particular ephemeral key pairs for use in terminal sessions.

Figure 4:
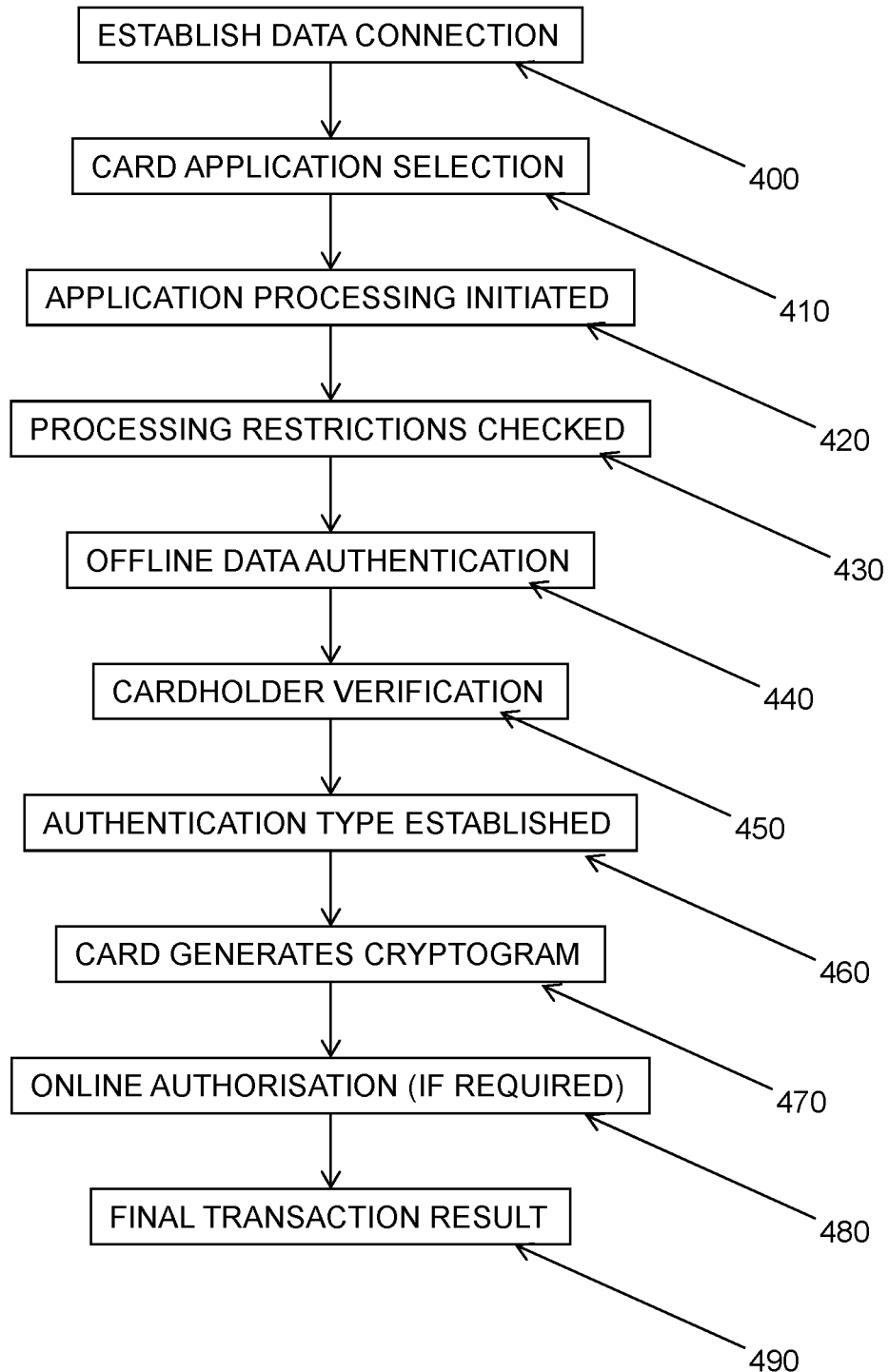
FIG. 4 shows a generic form of a transaction interaction between the payment card of FIG. 2 and the terminal of FIG. 3 in the payment infrastructure of FIG. 1.

The steps in a typical session between a payment card 21 and a terminal 31 are illustrated in FIG. 4—these steps are typical for a transaction implementing EMV protocols and do not define the present disclosure, but rather provide a context in which embodiments of the disclosure may be used.

The first step is to establish a data connection 400 between the card 21 and the terminal 31—this may be through contacts ("chip-and-PIN") in which case interaction protocols are governed by ISO/IEC 7816, or contactless through short range wireless communication, in which case interaction protocols are governed by ISO/IEC 14443. A suitable application (there may be multiple applications present) on the card 21 is selected 410 for the transaction and application processing initiated 420 with the terminal 31 providing required data to the card, and the card providing data relevant to its state. The terminal 31 checks 430 for any processing restrictions from the card data. Offline data authentication using public key cryptography is then used to validate 440 the card with this cryptographic capability and also to establish a secure channel between the card 21 and the terminal 31. Cardholder verification 450 (for example, through PIN entry at the terminal for a contact card) may then take place to evaluate whether the person controlling the card is the legitimate cardholder. The terminal may then evaluate whether online authentication is needed, and provides 460 the result of its action to the card. The card then generates 470 a cryptogram (the type of cryptogram depending on the authorisation type result provided by the terminal) and sends it to the terminal. If online authorisation is needed, the cryptogram is sent together with transaction data through the transaction infrastructure to the issuer for authorisation 480, with an authorisation result (possibly also providing data returned from the issuer for the card) returned to the terminal 31, leading to ultimate acceptance or refusal of the transaction 490.

Embodiments of the present disclosure relate to the establishment of a secure channel between the payment card 21 and the terminal 31. Current implementations of EMV protocols use RSA public key cryptography with DES and AES based symmetric key cryptography to establish secure communications. Future EMV protocols will replace RSA with ECC (Elliptic Curve Cryptography)—this was foreshadowed in an EMVCo Request for Comments in 2012 (found at http://www.emvco.com/specifcation-s.aspx?id=243) and analysed in detail in Brzuska et al, "An analysis of the EMV channel establishment protocol", ACM Conference on Computer and Communications Security—ACM CCS 2013, 373-386, 2013 and further in Smart, N., "Questions on the EMV Key Agreement Protocol", found at https://www.emvco.com/specifications.aspx?id=285.

The proposed scheme uses a Diffie-Hellman key exchange to establish a secure channel, but with ECC rather than RSA. Possible elliptic curves for use with this model include P-256 and P-521—other potential elliptic curve choices will be well understood by the person skilled in the art. While other forms of P-256 curve are known, the specific example discussed below is the NIST approved P-256, sometimes known as NIST P-256. Digital signatures for public key certificates may be generated by one of a number of different elliptic curve digital signature algorithms, such as those specified in ISO/IEC 14888. EC-SDSA (a digital signature based on the Schnorr signature algorithm) is one suitable choice—hashing may be carried out with SHA-2 or SHA-3 (or another suitable set of hash functions). Points in the elliptic curve group may be represented using the x-coordinate only.

In embodiments, the terminal is able to perform all necessary functions for any appropriate authenticated Diffie-Hellman protocol but the card (with much more limited processing capability) is not. In a Diffie-Hellman protocol, each party either uses an existing key pair or generates a new key pair, and exchanges public keys, with a shared secret established through use of each party's own private key in combination with the other party's public key—the general Diffie-Hellman mechanism will be familiar to the person skilled in the art. To provide additional protection for the static key pair of the card, in embodiments to which the present disclosure relates a random blinding factor (the "blind") is used by the card to provide additional protection for this key pair. The protocol resulting can be termed a Blinded Elliptic Curve Diffie-Hellman protocol.

Figure 5:
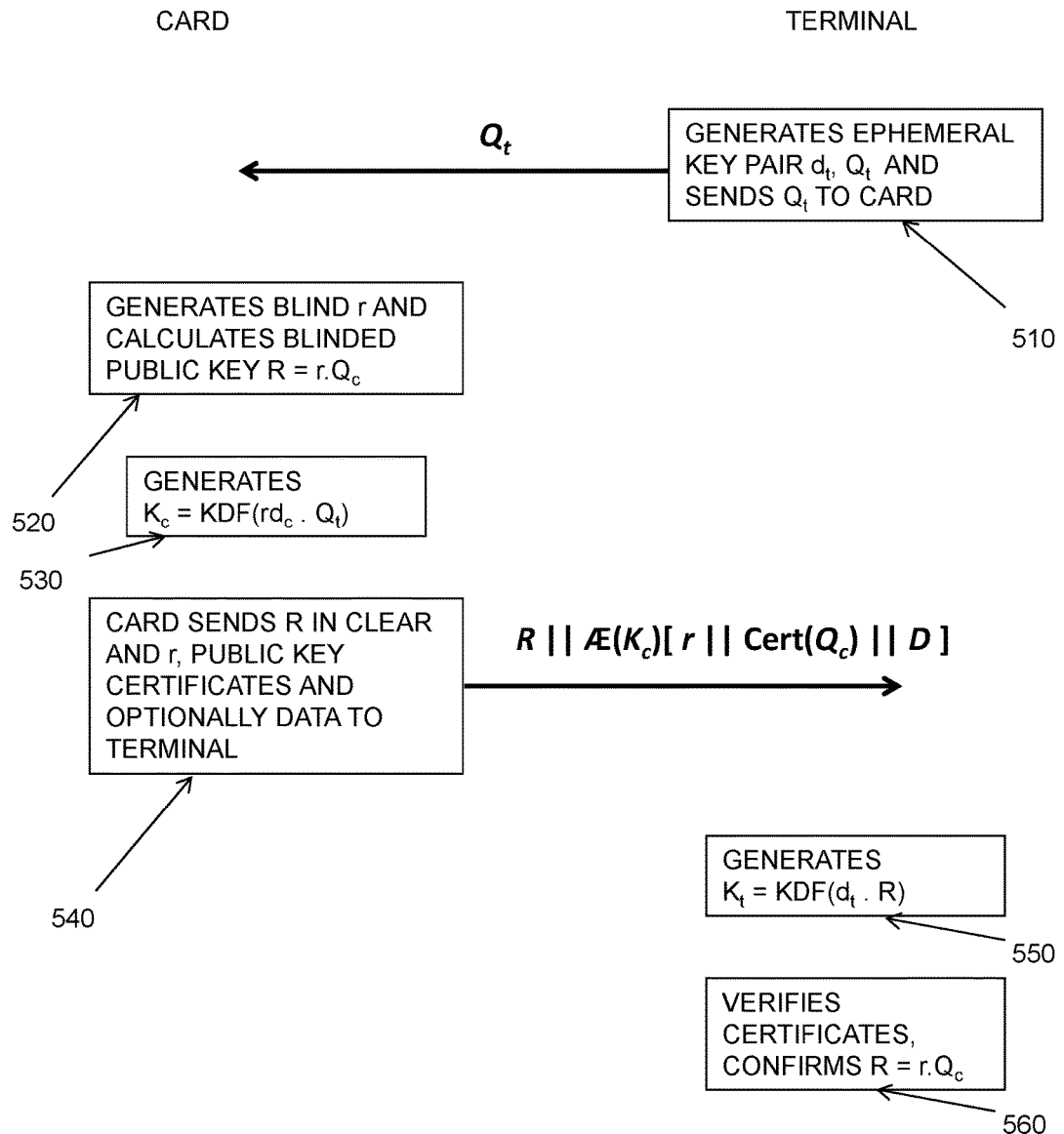
FIG. 5 outlines a Blinded Diffie-Hellman protocol for key generation to establish a secure channel used in embodiments of the disclosure.

The steps in a Blinded Elliptic Curve Diffie-Hellman protocol as used in embodiments of the disclosure are illustrated in FIG. 5. In the discussion that follows, an elliptic key pair comprises a private key d and a public key Q, where the public key Q results from performing d times an elliptic curve group generator point G. The card has a static key pair $d_c$, $Q_c$ whereas the terminal has the ability to create new short term (ephemeral) key pairs.

The terminal generates an ephemeral key pair $d_t$, $Q_t$ and sends $Q_t$ to the card (step 510). The card generates a blind r (this may be of whatever size is considered appropriate to achieve necessary computational efficiency and security—for embodiments discussed, this may for example be 32 bytes) and then calculates a blinded public key R=r·$Q_c$ (step 520). The card uses a Key Derivation Function to determine the card key $K_c$ for the secure channel (step 530) such that $K_c$=KDF(r$d_c$·$Q_t$). The card then sends R in clear with r, public key certificates and optionally additional data D encrypted with $K_c$ (step 540) to the terminal. The terminal derives the terminal key $K_t$ for the secure channel (step 550) such that $K_t$=KDF($d_t$·R), and also verifies certificates and that R=r·$Q_c$ (step 560). The secure channel is now established for communication in both directions.

In the arrangement shown in FIG. 5, the first action is taken by the terminal. In embodiments of the disclosure, the card may take the first step (of blinding the public key and sending it to the terminal), in which case equivalent functions are performed but with the terminal taking the first derivation step and sending the result to the card, which takes the second derivation step. The skilled person will be able to construct this approach without difficulty.

In order for the channel to be effectively secure, it should be robust against attacks that could plausibly be made against it. One known form of attack against elliptic curve cryptographic schemes is use of the quadratic twist. The nature of the quadratic twist and an associated twist attack is briefly described below, though the person skilled in the art of algebraic geometry will understand the nature of the quadratic twist. Potential twist attacks and other small sub-group attacks are discussed in, for example, https://safecurves.cr.yp.to/twist.html.

An elliptic curve group E is a set of points (solutions) over a field K to:

$$E=\{(x,y):y^2=f(x)=x^3+ax+b\}$$

For the curve P-256, discussed as an example here, f(x) is $f_{p256}(x)$ with values a and b as known for the P-256 curve discussed for example at http://csrc.nist.gov/groups/ST/toolkit/documents/dss/NISTReCur.pdf. The field is a 256-bit prime field defined by P-256.

It is an established result in algebraic geometry that an elliptic curve E defined over a field K has an associated quadratic twist, which is another elliptic curve E* which may be defined for the P-256 curve as being:

$$E^*=\{(x,y):y^2=-f_{p256}(x)\}$$

For any value x where $f_{p256}(x)$ is non-zero, the following is true:
- $f_{p256}(x)$ is a square, and thus x has two corresponding points (x, y) in E, or
- $f_{p256}(x)$ is not a square, and thus x does not have corresponding points in E but does have corresponding (two) points (x,y) in E*.

This is significant, because while E is a group of prime order, E* (at least in the case of P-256) is not. It has small sub-groups and is consequently exposed to small sub-group attacks. In the case of P-256, E* is a group of order m=34905m' for 240-bit prime m'. 34905 has small prime factors (3, 5, 13 and 179)—for the purpose of this specification, this product of small prime factors of the quadratic twist group order will be described as the "twist factor" of P-256, with other elliptic curves potentially having different twist factors (comprising a different set of prime factors). A small sub-group attack on the card could work in the following way. An attacker could choose $x_1$ corresponding to a point $Q_1$ on the twist in the sub-group of size 13 and send $x_1$ to the card. In a normal Diffie-Hellman arrangement, the card would then compute $d_cQ_1$—which will be another point in the sub-group of size 13. The attacker is provided with information that limits the choices greatly, and here will be able to determine $d_c$ mod 13 once the card has responded with an authenticated encrypted message using a key derived from $d_cQ_1$.

The conventional approach to defending against a small subgroup attack is computational—the relevant party can validate that the received $x_1$ corresponds to a point on E (or not to a point in a small subgroup of E*). In this case, the receiving party is the card. This calculation is relatively complex and could not be carried out quickly and effectively by the card.

In embodiments of the disclosure, the features of the blinded ECDH protocol as described above are used so as to provide an additional benefit of effective defence against quadratic twist attacks. This approach is to ensure that the product of the blinding factor r and the card private key $d_c$ has the twist factor as a factor. If this is done, then the twist factor is a pre-existing system characteristic, and an attacker gains no new information by the small sub-group attack.

This approach has a much lower computational burden and so can be performed much more effectively by the card. The simplest approach is to ensure that the blinding factor r is itself divisible by the twist factor. A more subtle approach is for the prime divisors of the twist factor to be split between the blinding factor r and the card private key $d_c$. This will again make the twist factor by design a factor of the product of the private keys and the blinding factor, meaning that it is a predefined system characteristic with no new information gained by a small sub-group attack.

The twist factor value of 34905 applies to the NIST P-256 elliptic curve. Other elliptic curve families will have different twist factors for their quadratic twist—as for the NIST P-256 example above, the twist factor of the quadratic twist may be a factor of the blinding factor, or its prime factors may be split between the blinding factor and the card private key $d_c$.

As discussed above, in the arrangement shown in FIG. 5, the first action is taken by the terminal, but in alternative embodiments the card may take the first step of blinding the public key and sending it to the terminal with equivalent functions performed thereafter. As the person skilled in the art will appreciate, defence against a small sub-group attack by using the quadratic twist can be provided using exactly the same approach of making the twist factor a factor of the product of the blinding factor and the card private key $d_c$.

As the person skilled in the art will appreciate, further embodiments may be devised according to the spirit and scope of the disclosure as set out above. While this disclosure has been described in the specific context of establishment of a secure channel between a payment card and a terminal implementing an EMV protocol, the person skilled in the art will appreciate that it is more generally applicable to any arrangement in which a secure channel is to be established using elliptic curve cryptography between a device suited to producing new key pairs and a device that has a valuable private key of a static key pair. Such an arrangement with public key blinding and defence against quadratic twist attacks may exist in other applications using passive cards, tags, or equivalent devices (for example, in an access control system where such devices are used to establish the identity of a bearer in a secure environment).

The invention claimed is:
1. A method of establishing a secure channel for communication between a payment device and a terminal device using an elliptic curve Diffie-Hellman protocol, wherein G is an elliptic curve generator point and the payment device has a unique private key $d_c$ with a public key $Q_c=d_c G$ certified by a party trusted by the terminal device, the method comprising:

the payment device generating a blinding factor r and sending a blinded public key $R=r \cdot Q_c$ to the terminal device;

the terminal device generating an ephemeral private key $d_t$ and a corresponding ephemeral public key $Q_t=d_t G$ and sending $Q_t$ to the payment device;

wherein the payment device generates $K_c=KDF(r\ d_c \cdot Q_t)$ and the terminal device generates $K_t=KDF(d_t \cdot R)$, where KDF is a key derivation function used in both generation operations, to establish a secure channel between the payment device and the terminal device;

wherein G is a point in the elliptic curve group E, wherein E is a group of prime order but E* is the quadratic twist of E and is a group of order $m=z \cdot m'$ where m' is prime and z is an integer;

wherein $r \cdot d_c$ is chosen such that z is a factor of $r \cdot d_c$.

2. The method of claim 1, wherein z is a factor of r.

3. The method of claim 1, wherein $z=z_1 \cdot z_2$, wherein $z_1$ and $z_2$ are integers, and $z_1$ is a factor of r and $z_2$ is a factor of $d_c$.

4. The method of claim 1, wherein G is a point on the NIST P-256 elliptic curve.

5. The method of claim 1, wherein the terminal device sends its ephemeral public key $Q_t$ to the payment device, before receiving the blinded public key R from the payment device.

6. The method of claim 1, wherein the payment device sends the blinded public key R and an encrypted blinding factor r to the terminal device.

7. The method of claim 6, wherein the payment device sends an encrypted public key certificate for the card public key $Q_c$ with the encrypted blinding factor r.

8. A payment device comprising a processor and a memory and configured to establish a secure channel for communication between the payment device and a terminal device using an elliptic curve Diffie-Hellman protocol, wherein G is an elliptic curve generator point and the payment device has a unique private key $d_c$ with a public key $Q_c=d_c G$ certified by a party trusted by the terminal device:

generating a blinding factor r and sending a blinded public key $R=r \cdot Q_c$ to the terminal device;

receiving an ephemeral private key $d_t$ and a corresponding ephemeral public key $Q_t=d_t G$ generated by the terminal device;

generating $K=KDF(r\ d_c \cdot Q_t)$ while the terminal device generates $K_t=KDF(d_t \cdot R)$, where KDF is a key derivation function used in both generation operations, to establish a secure channel between the payment device and the terminal device;

wherein G is a point in the elliptic curve group E, wherein E is a group of prime order but E* is the quadratic twist of E and is a group of order $m=z \cdot m'$ where m' is prime and z is an integer;

wherein $r \cdot d_c$ is chosen such that z is a factor of $r \cdot d_c$.

9. The payment device as claimed in claim 8, wherein the payment device is an externally powered passive device.

10. The payment device of claim 8, wherein $z=z_1 \cdot z_2$, wherein $z_1$ and $z_2$ are integers, and $z_1$ is a factor of r and $z_2$ is a factor of $d_c$.

11. The payment device of claim 8, wherein the payment device is further configured to send the blinded public key R and an encrypted blinding factor r to the terminal device.

12. The payment device of claim 11, wherein the payment device is further configured to send an encrypted public key certificate for the card public key $Q_c$ with the encrypted blinding factor r.

13. The payment device of claim 8, wherein z is a factor of r.

14. The payment device as claimed in claim 13, wherein the payment device is a payment card.

15. A terminal device comprising a processor and a memory and configured to establish a secure channel for communication between a payment device and the terminal device using an elliptic curve Diffie-Hellman protocol, wherein G is an elliptic curve generator point and the payment device has a unique private key $d_c$ with a public key $Q_c=d_c G$ certified by a party trusted by the terminal device:

receiving a blinded public key $R=r \cdot Q_c$ from the payment device, which has generated a blinding factor r;

generating an ephemeral private key $d_t$ and a corresponding ephemeral public key $Q_t=d_t G$ and sending Q to the payment device;

while the payment device generates $K_c=KDF(r\ d_c \cdot Q_t)$, generating $K_t=KDF(d_t \cdot R)$, where KDF is a key derivation function used in both generation operations, to establish a secure channel between the payment device and the terminal device;

wherein G is a point in the elliptic curve group E, wherein E is a group of prime order but E* is the quadratic twist of E and is a group of order $m=z \cdot m'$ where m' is prime and z is an integer;

wherein $r \cdot d_c$ is chosen such that z is a factor of $r \cdot d_c$.

16. The terminal device of claim 15, wherein z is a factor of r.

17. The terminal device of claim 15, wherein $z=z_1 \cdot z_2$, wherein $z_1$ and $z_2$ are integers, and $z_1$ is a factor of r and $z_2$ is a factor of $d_c$.

18. The terminal device of claim 15, wherein the terminal device is further configured to send its ephemeral public key $Q_t$ to the payment device, before receiving the blinded public key R from the payment device.

19. The terminal device of claim 15, wherein the terminal device is a terminal of a transaction system.

* * * * *